United States Patent [19]

Okland

[11] 4,257,620

[45] Mar. 24, 1981

[54] RUNNING BOARD AND METHOD FOR ASSEMBLING SAME

[76] Inventor: Merlyn C. Okland, 204 West Broad St., Story City, Iowa 50248

[21] Appl. No.: 958,900

[22] Filed: Nov. 9, 1978

[51] Int. Cl.³ .............................................. B62B 9/16
[52] U.S. Cl. ............................. 280/153 R; 280/164 R
[58] Field of Search .................. 280/163, 169, 152 R, 280/153 R, 164 R; 29/525

[56] References Cited

U.S. PATENT DOCUMENTS

| | | | |
|---|---|---|---|
| 1,406,728 | 2/1922 | Green | 280/163 |
| 1,433,773 | 10/1922 | Bersted | 280/164 R |
| 1,735,948 | 11/1929 | Boca | 280/163 |
| 1,825,012 | 9/1931 | Ornberg | 280/163 |
| 2,077,822 | 4/1937 | Baker | 280/163 X |
| 4,021,055 | 5/1977 | Okland | 280/153 R |

*Primary Examiner*—John J. Love
*Assistant Examiner*—D. W. Underwood

*Attorney, Agent, or Firm*—Zarley, McKee, Thomte, Voorhees & Sease

[57] ABSTRACT

The running board of the present invention comprises an elongated extruded board member having in cross section a horizontal central portion, an upper vertical portion extending upwardly from one edge of the horizontal portion, and a lower vertical portion extending downwardly from the opposite edge of the horizontal portion. On the bottom surface of the horizontal portion is a key way formed by two downwardly extending flanges. Transverse cross members are press fitted into the key way without use of bolts or other fasteners. An end cap is placed on the rearward end of the board member, and a mud flap is secured to the forward end of the board member and is also secured to the wheel well of the vehicle. Additional support members are secured to the transverse members and extend beneath the vehicle for securement to the vehicle cab.

14 Claims, 10 Drawing Figures

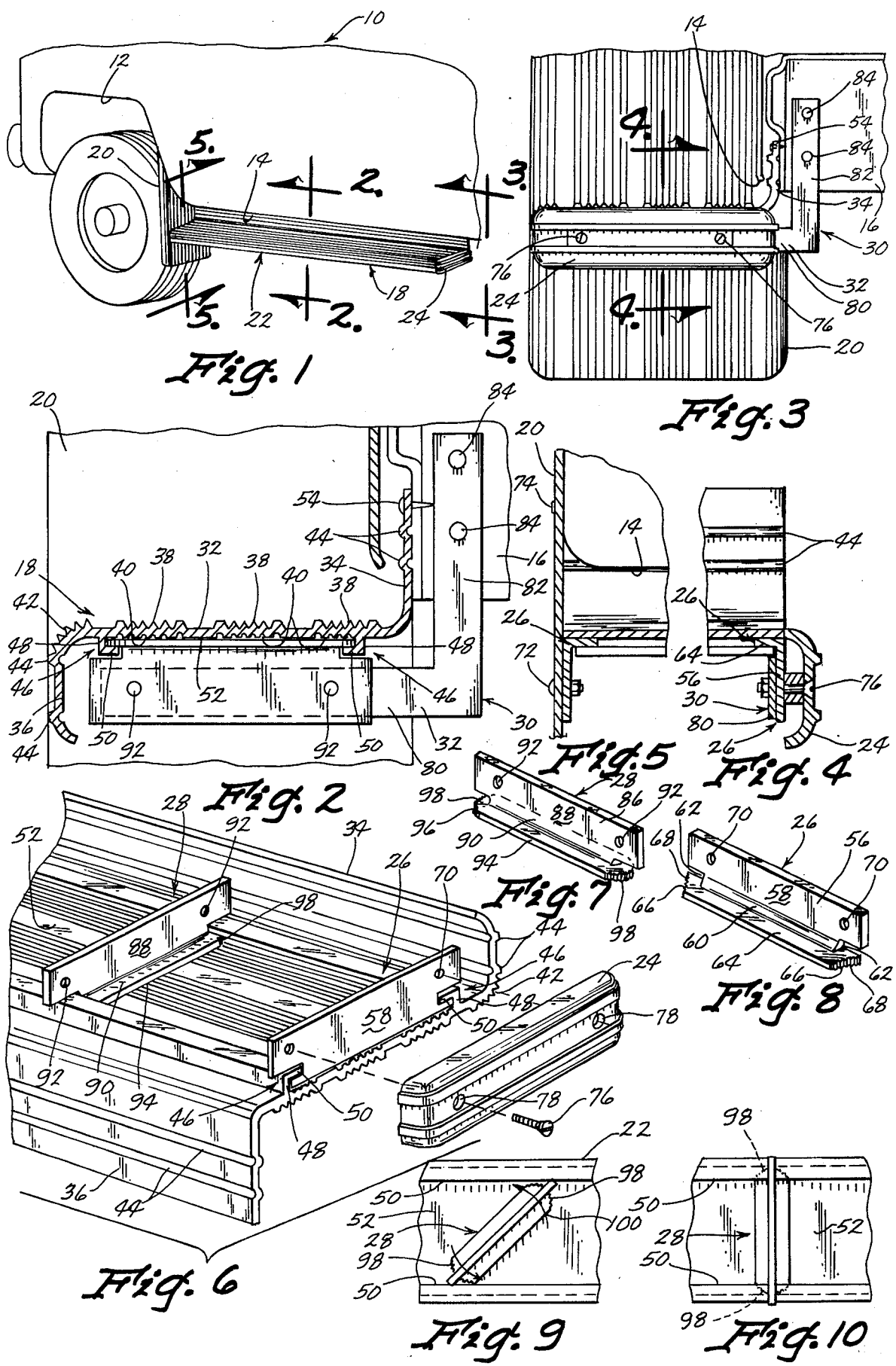

RUNNING BOARD AND METHOD FOR ASSEMBLING SAME

BACKGROUND OF THE INVENTION

This invention relates to a running board and method for assembling the same.

In recent years running boards have regained popularity for use on four wheel drive vehicles, pick-ups, vans and other vehicles which are supported a substantial distance above the ground. The running boards facilitate entry into the vehicle and also help protect the vehicle from damage caused by rocks and stones thrown by the vehicle wheels.

Presently known running boards usually require one or more cross members to be secured beneath the running board so as to reinforce the running board against bending when subjected to weight loads. These transverse members are usually bolted or welded to the underside of the running board. When bolts are used they extend through the running board and are exposed on the upper surface of the running board. Exposure of these bolts detracts from the appearance of the running board.

The use of welding to secure the transverse members to the undersurface of the running board is time consuming in the manufacturing process, and therefore adds to the expense of the running board. Also, welding is not always the most desirable means for securement, depending upon the particular alloys being used in the running board.

In order to minimize the cost of the running boards, most manufacturers use the least amount of material in the board as possible. This often results in weakening of the running board, and many running boards bend or deflect when subjected to the load of a person stepping thereon.

Numerous surfaces and textured patterns have been utilized on the upper surfaces of the running boards to minimize the possibility of slippage when persons step on the running boards. One problem encountered with present running boards is the lack of anti-slip materials on the outer edge of the running board. The outer edge of the running board is the most likely place for a person to step, and therefore anti-slip protection is desirable at this location.

Many running boards presently on the market have sharp corners which can scratch or injure persons.

Another problem encountered with present running boards, particularly running boards made from aluminum, is the tendency of the board to be scratched during shipping and handling. This detracts from the outward apperance of the running board and makes it less desirable from a commercial standpoint.

SUMMARY OF THE INVENTION

The present invention utilizes a running board having a key way formed on the undersurface thereof. The transverse members include keys which are sized to fit within the key way with a press fit so as to be secured in fixed relationship to the undersurface of the running board. The key way runs the entire length of the running board and therefore transverse members may be secured at various points along the entire length of the running board.

An end cap is provided for placement at the rearward end of the running board so as to shield the sharp corners thereof and protect persons from being scratched or cut by the sharp corners of the running board.

The forward end of the running board is fastened to a mud flap which in turn is fastened to the interior of the front wheel well of the vehicle. Bolts extend through the mud flap and also through one of the transverse members placed at the forward end of the running board.

The transverse members are secured to the undersurface of the running board without the need for bolts, and therefore the upper surfaces of the running board is free from bolts or other visually distracting securing devices. Ribs are provided on the outer corner of the running board along the entire length thereof, and as a result these ribs minimize the tendency of persons to slip when they step on the outer most edge of the running board.

Additional ribs are provided along the entire length of the running board in various patterns and these ribs protect the remainder of the upper surface of the running board from items which might scratch or damage the appearance thereof during shipping and handling.

Therefore, a primary object of the present invention is the provision of an improved running board and method for assembling the same.

A further object of the present invention is the provision of a running board and method for assembling same which eliminates the needs for bolts extending through the upper surface of the running board.

A further object of the present invention is the provision of a running board and method for assembling the same which utilizes a press fit for attaching the transverse members on the under surface of the running board.

A further object of the present invention is the provision of a running board and method for assembling same which utilizes a board member of minimum thickness, but which includes means for reinforcing the board member against both transverse and longitudinal bending in response to the weight of a person stepping on the running board.

A further object of the present invention is the provision of a running board which includes means for preventing slippage adjacent the outer edge of the running board.

A further object of the present invention is the provision of a running board which protects persons against sharp corners which might cause cuts or scratches.

A further object of the present invention is the provision of a running board which is protected against scratching or defacing during shipment and handling.

A further object of the present invention is the provision of a running board and method of assembling same which is economical, results in a durable running board and which results in a running board which is attractive in appearance.

BRIEF DESCRIPTION OF THE FIGURES OF THE DRAWINGS

FIG. 1 is a partial perspective view of a vehicle having a running board of the present invention mounted thereon.

FIG. 2 is a sectional view taken along line 2—2 of FIG. 1.

FIG. 3 is a sectional view taken along line 3—3 of FIG. 1.

FIG. 4 is a sectional view taken along line 4—4 of FIG. 2.

FIG. 5 is a sectional view taken along line 5—5 of FIG. 1.

FIG. 6 is a partial enlarged exploded perspective view of the undersurface of the running board.

FIG. 7 is a perspective view of the transverse member utilized intermediate the opposite ends of the running board.

FIG. 8 is a perspective view of the transverse member utilized at the opposite ends of the running board.

FIG. 9 is a partial plan view showing the position of the transverse member immediately prior to being press fitted into the key way of the under surface of the running board.

FIG. 10 is a partial view illustrating the position of the transverse member after being press fitted into the key way on the under surface of the vehicle.

DETAILED DESCRIPTION OF THE INVENTION

Referring to the drawings, the numeral 10 generally represents a vehicle having a forward wheel well 12, a horizontal body portion 14 extending rearwardly from said wheel well 12, and a vehicle frame 16 (FIG. 3) located on the undersurface of the vehicle.

The numeral 18 refers generally to the running board of the present invention. The primary complement parts of the running board include a mud flap 20, a board member 22, a rear cap 24, end transverse members 26, intermediate transverse member 28 and L-shaped brackets 30.

Board member 22 is preferably constructed of extruded aluminum, and therefore has the same cross-sectional configuration along its entire length. In cross-section (FIG. 2) board member 22 includes an elongated horizontal portion 32 having extending upwardly from one edge thereof an upper vertical portion 34 and having extending downwardly from the opposite edge thereof a lower vertical portion 36. A plurality of ribs 38 protrude upwardly from the upper surface of horizontal portion 32 and extend along the length thereof for providing an attractive appearance and also for minimizing the tendency of a person to slip when stepping on the horizontal portion. Furthermore, ribs 38 help protect the remaining flat surfaces of horizontal portion 32 from being exposed to objects which will cause scratches and other defacing of the surface. Aluminum is particularly susceptible to scratching during shipping and handling, and therefore ribs 38 help minimize the tendency of the aluminum surface to scratch. The undersurface of horizontal portion 32 includes complementary grooves 40 which are positioned to register with the ribs 38. The provision of complementary grooves 40 minimizes the material which is used in the extruded board member while at the same time maintaining approximate constant thickness of the board member throughout its width.

A series of corner ribs 42 are provided adjacent the outer edge of horizontal portion 32 and protrude upwardly therefrom so as to provide a friction surface for exposure to a person's foot when the person's foot is placed on the outer edge of the running board. The outer edge of the running board is the most likely place where a person will place his foot when entering the vehicle, and therefore the placement of ribs 44 is important to prevent slipping when persons are entering the vehicle.

Additional ribs 44 are provided on vertical portions 34, 36 of board member 22, and these ribs are decorative as well as protecting the flat surfaces from exposure to objects which will tend to scratch or mar the flat surfaces of the aluminum.

Extending downwardly from the bottom surface of horizontal portion 32 are a pair of spaced apart lip flanges 46, each of which include a downwardly extending portion 48 and a transverse extending portion 50. Together lip flanges 46 provide a key way 52 which extends along the entire length of board member 22.

Upper vertical portion 34 is secured to the horizontal body portion 14 along the entire length thereof by means of a plurality of screws or other securing means 54.

Referring to FIG. 8, end transverse member 26 comprises a vertical plate portion 56 which is approximately T-shaped, having a T-cross bar 58 and a T-base 60. The T-shaped configuration of vertical plate portion 56 forms a pair of opposite notches 62 on the opposite sides of T-base 60.

Integrally formed with T-base 60 and extending in a plane perpendicular thereto is a key plate 64 which includes beveled edges 66 at its opposite ends, thereby causing key plate 64 to have a trapezoidal shape. The drawings show knurled surfaces 68 on the ends of key plate 64. These knurled surfaces are optional, but are helpful in facilitating a tight press fit when key plate 64 is force fitted into the key way 52 on the undersurface of horizontal portion 32.

The press fitting of end transverse member 26 into key way 52 is shown in FIGS. 4 and 6. The beveled edges 66 facilitate the press fitting of the transverse member 26 into key way 52, and knurls 68, if used, further facilitate a tight frictional fit within the key way. As can be seen in FIG. 4, the cross-sectional configuration of end transverse member 26 is L-shaped in cross-section.

A pair of holes 70 is provided in vertical plate portion 56 of transverse member 26. End transverse members 26 are force fitted into the opposite ends of board member 22. At the forward end of board member 22, mud flap 20 is bolted to end transverse member 26 by means of bolts 72 which extend through holes 70. The upper end of mud flap 20 is secured to the interior of forward wheel well 12 by means of screws 74.

At the rearward end of board member 22, is mounted rear cap 24. Rear end cap 24 is mounted to the rearward end of board member 22 by means of bolts 76 which extend through a pair of holes 78 in end cap 24 and thence through holes 70. End cap 24 has rounded corners and is sized to fit over the end of board member 22 and form a protective shield over sharp corners at the end of the board member.

Referring to FIGS. 3 and 4, L-shaped bracket 30 includes a horizontal portion 32 which is in facing engagement with vertical plate portion 56 of transverse member 26, and which is secured thereto by bolts 76 so that end cap 24, L-shaped bracket 30 and transverse member 26 are all secured together by virtue of bolts 76. L-shaped bracket 30 also includes a vertical leg 82 which includes a pair of bolt holes 84 to permit bolting to vehicle cab 16.

Referring to FIGS. 6 and 7, intermediate transverse member 28 includes a vertical plate portion 86 which is T-shaped in configuration similar to vertical plate portion 56, and which includes a T-cross bar 88 and a T-base 90. A pair of holes 92 are provided in vertical plate portion 86. Connected to vertical plate portion 86 is an eliptically shaped key plate 94 which has rounded ends 96 and which includes knurls 98 at the opposite ends thereof. Key plate 94 and vertical plate portion 86 are of integral construction and form a T-shaped cross sectional configuration as opposed to the L-shaped configuration of member 26.

Referring to FIGS. 6, 9 and 10, intermediate transverse member 28 is mounted intermediate the opposite ends of Board member 22. Mounting is accomplished by placing transverse member 28 in the position shown in FIG. 9 wherein the longitudinal axis thereof is oblique with respect to a line transverse to the longitudinal axis of board member 22. Transverse member 28 is then rotated in a direction such as indicated by arrows 100 to the position shown in FIG. 10. This causes key plate 94 to be forced beneath the transversely extending portions 50 of lip flanges 46, thereby securing transverse member 28 in fixed relation within key way 52. The rounded ends 98 of transverse member 28 facilitate this twisting action.

Once intermediate transverse member 28 is secured in position, an additional L-shaped bracket 30 is bolted thereto in the manner shown in FIG. 2, and the upper leg 82 of L-shaped bracket 30 is bolted to frame 16.

The key way 52 formed by lip flanges 46 strengthens the board member 22 along its length and helps protect against bending in response to pressure and weight of individuals stepping on the running board. Similarly, the transverse members 26, 28 further strengthen the running board against deflection when persons step on the running board.

The device is simple in construction and may be manufactured by an extruded process. Assembly may be easily accomplished by press fitting the transverse members in place. No bolts are present on the upper surface of the board.

Thus, the device accomplishes at least all of its stated objectives.

What is claimed is:

1. A running board for a vehicle having a front wheel well, a horizontal body portion extending rearwardly from said wheel well, and a cab frame; said running board comprising:
   an elongated board member comprising in cross section a central horizontal portion having opposite longitudinal edges, an upper vertical portion extending upwardly from one longitudinal edge of said horizontal portion, and a lower vertical portion extending downwardly from the opposite longitudinal edge of said horizontal portion;
   means for securing said upper vertical portion of said board member to said horizontal portion of said vehicle;
   said horizontal portion of said board member having first securing means extending downwardly from the under surface of said horizontal portion, said first securing means comprising, a pair of spaced apart flanges extending downwardly from said board member, said spaced apart flanges having inwardly projecting lips extending towards one another;
   at least one transverse member positioned below said horizontal portion of said board member and extending transversely thereof;
   said transverse member having an elongated vertical plate portion and a horizontal key portion integrally formed with said vertical plate portion, said horizontal key portion being elongated and having a pair of outwardly projecting lips at the opposite longitudinal ends thereof, said outwardly projecting lips forming second securing means, in retentive engagement with said inwardly projecting lips of said flanges for attaching said transverse member to said board member in fixed relation thereto;
   means for opeatively connecting said transverse member to said cab frame.

2. A running board according to claim 1 wherein said board member is formed by extrusion as to have the same cross sectional configuration along its entire length.

3. A running board according to claim 2 wherein said first securing means comprises an integral part of said extruded board member and has the same cross sectional configuration along the length of said board member.

4. A running board according to claim 3 wherein said transverse member is attached to said board member adjacent one end thereof and a second transverse member identical to said first mentioned transverse member is attached in similar fashion to the opposite end of said board member.

5. A running board according to claim 1 wherein said first and second securing means are press fitted into retentive engagement with one another.

6. A running board according to claim 1 wherein a plurality of elongated parallel ribs protrude upwardly from the upper surface of said horizontal surface of said board member and extend longitudinally along the length thereof.

7. A running board according to claim 6 wherein at least a portion of said ribs are located adjacent said opposite edge of said horizontal portion.

8. A running board according to claim 1 wherein said horizontal plate portion of said transverse member includes beveled end edges which impart a trapezoidal shape to said horizontal portion and which form said outwardly projecting lips for engaging said inwardly projecting lips.

9. A running board according to claim 8 wherein said vertical plate portion has a T-shaped configuration with the base of the T being connected to said horizontal plate portion and the longitudinal axis of the cross bar of the T being parallel to the horizontal plate portion.

10. A running board according to claim 8 wherein said transverse member further comprises a horizontal plate portion fixed to the upper edge of said plate portion, said horizontal and vertical plate portions forming a T-shaped cross-sectional configuration.

11. A running board according to claim 4 wherein a mud flap having upper and lower ends has its upper end operatively attached to said wheel well, bolt means securing said flap to the one of said transverse members positioned adjacent the forward end of said board member.

12. A running board according to claim 11 wherein a cap member is positioned in covering relation over the rearward end of said board member and in facing relation to the one of said transverse members located at said rearward end of said board member, cap securing means operatively securing said cap member to said transverse member.

13. A method for assembling a running board for vehicles having a front wheel well, a horizontal body portion extending rearwardly from said front wheel well, and a body frame, said method comprising:
   forming an elongated board member comprising in cross section a central horizontal portion having opposite longitudinal edges, an upper vertical portion extending upwardly from one longitudinal edge of said horizontal portion, a lower vertical portion extending downwardly from the opposite longitudinal edge of said horizontal portion, and a pair of lip flanges each extending downwardly and transversely from the bottom surface of said horizontal portion to provide a key way therein;

securing at least one transverse member to the bottom of said horizontal portion in a position wherein said transverse member extends transversely of said horizontal portion, said securing being accomplished by press fitting into said key way a key portion of said transverse member sized and shaped to frictionally fit within said key way so as to frictionally retentively engage said lip flanges, accomplishing said press fitting by positioning said key portion between said lip flanges in a preparatory position wherein said longitudinal axis of said transverse member is oblique with respect to a line transverse to the longitudinal axis of said board member, rotating said transverse member to a locked position wherein said key portion is disposed transversely with respect to said longitudinal axis of said board member and is forced into frictional retentive engagement with said lip flanges of said key way.

14. A method according to claim 13 wherein said press fitting is accomplished by forcing said key portion axially with respect to said board member into said key way.

* * * * *